(12) United States Patent
Maruichi et al.

(10) Patent No.: US 8,691,394 B2
(45) Date of Patent: Apr. 8, 2014

(54) HEAT SHRINKABLE MULTILAYER FILM AND HEAT SHRINKABLE LABEL

(75) Inventors: Naoyuki Maruichi, Moriyama (JP);
Takanori Nozaki, Moriyama (JP);
Akira Morikawa, Moriyama (JP);
Atsushi Nakagawa, Yokkaichi (JP)

(73) Assignees: Gunze Limited, Kyoto (JP); Mitsubishi Chemical Corporation, Tokyo (JP)

( * ) Notice: Subject to any disclaimer, the term of this patent is extended or adjusted under 35 U.S.C. 154(b) by 444 days.

(21) Appl. No.: 12/309,153

(22) PCT Filed: Jul. 11, 2007

(86) PCT No.: PCT/JP2007/063836
§ 371 (c)(1),
(2), (4) Date: Apr. 17, 2009

(87) PCT Pub. No.: WO2008/007710
PCT Pub. Date: Jan. 17, 2008

(65) Prior Publication Data
US 2009/0202851 A1    Aug. 13, 2009

(30) Foreign Application Priority Data

Jul. 12, 2006  (JP) ................................ 2006-192188
Aug. 11, 2006  (JP) ................................ 2006-220200

(51) Int. Cl.
*B32B 27/08*  (2006.01)
*B32B 27/30*  (2006.01)
*B32B 27/36*  (2006.01)

(52) U.S. Cl.
USPC .......... 428/483; 428/34.9; 428/480; 428/521; 428/914

(58) Field of Classification Search
None
See application file for complete search history.

(56) References Cited

U.S. PATENT DOCUMENTS

| | | | | |
|---|---|---|---|---|
| 5,385,987 | A | * | 1/1995 | Hamazaki et al. ............. 525/445 |
| 5,543,474 | A | * | 8/1996 | Kawaki et al. ........... 525/440.04 |
| 2009/0280341 | A1 | * | 11/2009 | Maruichi et al. .............. 428/483 |

FOREIGN PATENT DOCUMENTS

| | | | |
|---|---|---|---|
| EP | 1 752 285 | | 2/2007 |
| JP | 61-041543 | * | 2/1986 |
| JP | 61-41543 | | 2/1986 |
| JP | 10-080977 | * | 3/1998 |
| JP | 10-130451 | | 5/1998 |
| JP | 2002-351332 | * | 12/2002 |
| JP | 2004-1252 | | 1/2004 |

(Continued)

OTHER PUBLICATIONS

"Grades & Material Properties of PELPRENE™", (www.toyobo-global.com) webpage retrieved Oct. 21, 2011.*

*Primary Examiner* — Vivian Chen
(74) *Attorney, Agent, or Firm* — Hamre, Schumann, Mueller & Larson, P.C.

(57) ABSTRACT

It is an object of the present invention to provide a heat-shrinkable multilayer film which, in the case of using the heat-shrinkable multilayer film as a heat-shrinkable label for a container, does not produce delamination in covering a container, is superior in heat resistance, oil resistance, tearing properties along the perforation and appearance and can prevent the reduction in strength between the layers after a printing step, and a heat-shrinkable label comprising the heat-shrinkable multilayer film as a base film. The present invention is a heat-shrinkable multilayer film which comprises: an outer surface layer comprising a polyester type resin; and an intermediate layer comprising a polystyrene type resin, said outer surface layer and said intermediate layer being laminated by interposing an adhesive layer comprising a polyester type elastomer or a modified polyester type elastomer.

5 Claims, 3 Drawing Sheets

(56) References Cited

FOREIGN PATENT DOCUMENTS

| JP | 2004-27660 | * | 10/2004 |
| JP | 2004-276600 | * | 10/2004 |
| JP | 2006-15745 | | 1/2006 |
| JP | 2006-159903 | * | 6/2006 |
| WO | 2005/118288 | | 12/2005 |

* cited by examiner

HEAT SHRINKABLE MULTILAYER FILM AND HEAT SHRINKABLE LABEL

TECHNICAL FIELD

The present invention relates to a heat-shrinkable multilayer film which, in the case of using the heat-shrinkable multilayer film as a heat-shrinkable label for a container, does not produce delamination in covering a container, is superior in heat resistance, oil resistance, tearing properties along the perforation and appearance and can prevent the reduction in strength between the layers after a printing step, and a heat-shrinkable label comprising the heat-shrinkable multilayer film as a base film.

BACKGROUND ART

In recent years, many containers such as PET bottles and metal cans are covered with heat-shrinkable labels prepared by performing printing on a base film of a heat-shrinkable resin film.

As such a heat-shrinkable resin film, films comprising polystyrene type resin predominate since it is superior in low temperature shrinkability. However, since the polystyrene type resin film has inadequate heat resistance, there was a problem that for example, the heat-shrinkable resin label may be shrunk and the label may be distorted or broken when a PET bottle topples in being heated in a hot warmer equipped in a convenience store, and the like. Furthermore, the polystyrene type resin film also has a problem that since it has inadequate solvent resistance, it may be shrunk or dissolved by the adhesion of oils when it is used for the packaging of articles containing oils.

On the other hand, efforts to use a polyester type film, which is superior in heat resistance and solvent resistance, in place of a polystyrene type resin film as a heat-shrinkable label are made. But, the polyester type film has a problem that it tends to produce crinkles when it covers a container since it has bad low temperature shrinkability and is shrunk rapidly. Further, perforation for tearing off is often provided on the shrink film so that the heat-shrinkable label can be easily torn off and removed from the used container in order to recycle containers, but in the polyester type film, there was also a problem that tearing properties along the perforation are poor, and therefore the heat-shrinkable label cannot be easily torn off and removed from the container. Furthermore, in the polyester type film, there was a problem that since it has large shrinking stress, in the case of using the polyester type film as a label for hot beverages, the label shrinks and compresses the container due to heating of the beverages at the time of sale and thereby a level of the content of the container rises to cause the content to spill over the container.

For this situation, in Patent Document 1, a hard multilayer shrinkable film obtainable by laminating outer surface layers comprising a polyester type resin on an intermediate layer comprising a polystyrene type resin with an adhesive layer comprising an olefin type resin interposed between the outer surface layer and the intermediate layer, is disclosed. Further, in Patent Document 2, a heat-shrinkable label, which includes a base film obtainable by laminating outer surface layers comprising a polyester type resin comprising a specific monomer on both sides of an intermediate layer comprising a polystyrene type resin, and by laminating the outer surface layers and the intermediate layer without an adhesive layer interposed between the outer surface layer and the intermediate layer, is disclosed. Furthermore, in Patent Document 3, a laminated film having a surface layer comprising a polyester type resin, an intermediate layer comprising a styrene type resin and an adhesive layer comprising an adhesive resin, is disclosed. The heat-shrinkable labels comprising these multilayer films are superior in low temperature shrinkability and tearing properties along the perforation by the virtue of the intermediate layer comprising a polystyrene type resin, and further they are also superior in solvent resistance and heat resistance since the intermediate layer is covered with the outer surface layers comprising a polyester type resin.

However, if these heat-shrinkable labels cover the containers actually, there were problems that in the hard multilayer shrinkable film described in Patent Document 1, the intermediate layer may be peeled off from the outer surface layer in covering the container, and in the heat-shrinkable label described in Patent Document 2, after covering the container with the heat-shrinkable label, if the films rub against each other during transportation of products or the film is scratched with a fingernail or a body, peeling may occur between an intermediate layer and an outer surface layer.

Further, when the heat-shrinkable labels are used for PET bottles for drinking, decoration of labels is performed by printing for the purpose of differentiating products from those of other companies or enhancing images of user. However, since printing ink used in a printing step of the label generally contains an organic solvent, a trace of the organic solvent remains on the printed surface after printing and drying. Thereby, a problem that when the heat-shrinkable film described in Patent Document 3 is used, an adhesive property between the outer surface layer and the intermediate layer is affected by a residual organic solvent and adhesion strength between the outer surface layer and the intermediate layer after a printing step is significantly reduced in comparison with that before the printing step has newly arisen.

Accordingly, a heat-shrinkable multilayer film, which, in the case of using the heat-shrinkable multilayer film as a heat-shrinkable label for a container, does not produce peel between the outer surface layer and the intermediate layer in covering a container, is superior in heat resistance, oil resistance, tearing properties along the perforation and appearance, is less-affected by an organic solvent used in a printing step and has adequate adhesion strength after the printing step, has been required.

Patent Document 1: Japanese Kokai Publication Sho-61-41543
Patent Document 2: Japanese Kokai Publication 2002-351332
Patent Document 3: Japanese Kokai Publication 2006-15745

DISCLOSURE OF THE INVENTION

Problems to be Solved by the Invention

In view of the above state of the art, it is an object of the present invention to provide a heat-shrinkable multilayer film which, in the case of using the heat-shrinkable multilayer film as a heat-shrinkable label for a container, does not produce delamination in covering a container, is superior in heat resistance, oil resistance, tearing properties along the perforation and appearance and can prevent the reduction in strength between the layers after a printing step, and a heat-shrinkable label comprising the heat-shrinkable multilayer film as a base film.

BRIEF DESCRIPTIONS OF THE DRAWINGS

MEANS FOR SOLVING THE PROBLEMS

Figure 1:
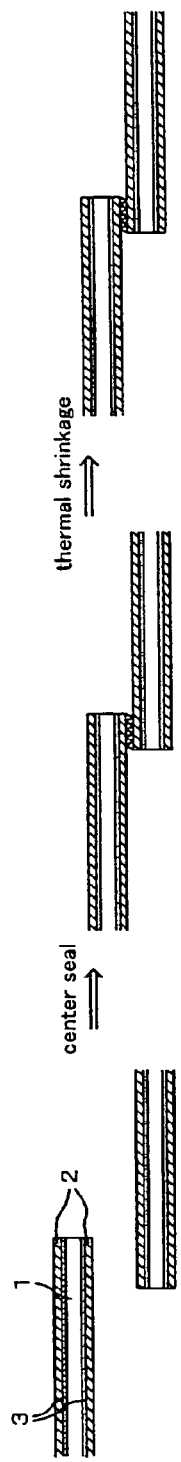
FIG. 1 is a schematic view showing the states of and around a center seal portion in succession of covering steps in employing the heat-shrinkable label of the present invention.

The present invention is a heat-shrinkable multilayer film which comprises: an outer surface layer comprising a polyester type resin; and an intermediate layer comprising a polystyrene type resin, said outer surface layer and said intermediate layer being laminated by interposing an adhesive layer comprising a polyester type elastomer or a modified polyester type elastomer.

Hereinafter, the present invention will be described in detail.

The present inventors found that in the heat-shrinkable label comprising the heat-shrinkable multilayer film obtained by laminating outer surface layers comprising a polyester type resin on an intermediate layer comprising a polystyrene type resin with an adhesive layer interposed between the outer surface layer and the intermediate layer as a base film, the heat-shrinkable label can stably cover containers without producing the delamination by bonding the outer surface layers to the intermediate layer with an adhesive layer comprising a polyester type elastomer or a modified polyester type elastomer interposed therebetween. Further, the present inventors found that, in the case of using such a constitution, the reduction in strength between the layers after a printing step can be inhibited. These findings have now led to completion of the present invention.

The heat-shrinkable multilayer film of the present invention is formed by laminating outer surface layers comprising a polyester type resin on an intermediate layer comprising a polystyrene type resin with an adhesive layer comprising a polyester type elastomer or a modified polyester type elastomer interposed between the outer surface layer and the intermediate layer.

The polyester type elastomer is preferably a saturated polyester type elastomer, and particularly preferably a saturated polyester type elastomer containing polyalkylene ether glycol segments.

As the saturated polyester type elastomer containing polyalkylene ether glycol segments, for example, block copolymers comprising an aromatic polyester as a hard segment and polyalkylene ether glycol or an aliphatic polyester as a soft segment are preferable. Furthermore, polyester polyether block copolymers containing polyalkylene ether glycol as a soft segment are more preferable.

The polyester polyether block copolymer is preferably produced by polycondensation of an oligomer obtained by esterification reaction or transesterification reaction between (i) aliphatic and/or alicyclic diol having 2 to 12 carbon atoms, (ii) an aromatic and/or aliphatic dicarboxylic acid or an alkyl ester thereof, and (iii) polyalkylene ether glycol as raw materials.

As the aliphatic and/or alicyclic diol having 2 to 12 carbon atoms, for example, diols ordinarily used as raw materials for polyesters, particularly raw materials for polyester type elastomers can be used. Specific examples of the aliphatic and/or alicyclic diol having 2 to 12 carbon atoms include ethylene glycol, propylene glycol, trimethylene glycol, 1,4-butanediol, 1,4-cyclohexanediol, 1,4-cyclohexanedimethanol, and the like. Among these diols, 1,4-butanediol and ethylene glycol are preferable, and 1,4-butanediol is particularly preferable. These diols may be used singly or in combination of two or more species.

As the aromatic dicarboxylic acid, those ordinarily used as raw materials for polyesters, particularly raw materials for polyester type elastomers can be used. Specific examples of the aromatic dicarboxylic acid include terephthalic acid, isophthalic acid, phthalic acid, 2,6-naphthalene dicarboxylic acid, and the like. Among these aromatic dicarboxylic acids, terephthalic acid and 2,6-naphthalene dicarboxylic acid are preferable, and terephthalic acid is particularly preferable. These aromatic dicarboxylic acids may be used singly or in combination of two or more species.

Examples of alkyl esters of the aromatic dicarboxylic acids include dimethyl esters or diethyl esters of the above aromatic dicarboxylic acids. Among there, dimethyl terephthalate and 2,6-dimethylnaphthalene dicarboxylate are preferable.

As the aliphatic dicarboxylic acid, cyclohexane dicarboxylic acids are preferable. As the alkyl ester thereof, dimethyl esters or diethyl esters of the cyclohexane dicarboxylic acids are preferable.

In addition to the above components, a small amount of a trifunctional alcohol, a tricarboxylic acid or an ester thereof may be copolymerized therewith. Further, aliphatic dicarboxylic acids such as adipic acid or dialkyl esters thereof may also be used as a copolymer component.

Examples of the polyalkylene ether glycol include polyethylene glycol, poly(1,2- and/or 1,3-propylene ether) glycol, poly(tetramethylene ether) glycol, poly(hexamethylene ether)glycol and the like.

A preferable lower limit of a number average molecular weight of the polyalkylene ether glycol is 400, and a preferable upper limit is 6000. When the number average molecular weight is 400 or more, a blocking property of the copolymer is enhanced, and when the number average molecular weight is 6000 or less, phase separation in a system becomes hard to occur and physical properties as a polymer becomes easy to be exhibited. More preferably, the lower limit is 500, and the upper limit is 4000. Further more preferably, the lower limit is 600, and the upper limit is 3000. In addition, the number average molecular weight used herein refers to the value measured by gel permeation chromatography (GPC). The calibration for GPC can be performed by use of, for example, "POLYTETRAHYDROFURAN CALIBRATION KIT" (manufactured by POLYMER LABORATORIES INC., GB.).

Examples of the commercialized product of the polyester type elastomer include "PRIMALLOY" produced by Mitsubishi Chemical Corp., "PELPRENE" produced by Toyobo Co., Ltd., "Hytrel" produced by Du Pont-Toray Co., Ltd., and the like.

When a polyester polyether block copolymer comprising a polyester and polyalkylene ether glycol is used as the polyester type elastomer, a preferable lower limit of the content of the polyalkylene ether glycol component is 5% by weight, and a preferable upper limit is 90% by weight. When the content of the polyalkylene ether glycol component is 5% by weight or more, the block copolymer becomes excellent in flexibility and impact resistance, and when the content is 90% by weight or less, the block copolymer becomes excellent in hardness and mechanical strength. More preferably, the lower limit is 30% by weight, and the upper limit is 80% by weight. Further more preferably, the lower limit is 55% by weight.

In addition, the content of the polyalkylene ether glycol component can be calculated from the chemical shift and content of hydrogen atoms using nuclear magnetic resonance (NMR) spectroscopy.

The modified polyester type elastomer is obtained by modifying a polyester type elastomer with a modifying agent.

A modification reaction for obtaining the modified polyester type elastomer is performed, for example, by reacting the polyester type elastomer with α,β-ethylenic unsaturated carboxylic acid as the modifying agent. In the modification reaction, a radical generator is preferably used. In the modification reaction, a graft reaction, in which the α,β-ethylenic unsaturated carboxylic acid or its derivative is added to the polyester type elastomer, mainly occurs, but a decomposition reaction also occurs. Consequently, a molecular weight of the modified polyester type elastomer is lowered and melt viscosity of the elastomer is lowered.

Further, it is considered that in the modification reaction, generally, a transesterification reaction, and the like, also occur as other reactions, and the resulting products generally become compositions containing an unreacted raw material and the like. In this case, a lower limit of the content of the modified polyester type elastomer in the resulting product is preferably 10% by weight, and more preferably 30% by weight, and the content of the modified polyester type elastomer is furthermore preferably 100% by weight.

Examples of the α,β-ethylenic unsaturated carboxylic acid include unsaturated carboxylic acids such as acrylic acid, maleic acid, fumaric acid, tetrahydrofumaric acid, itaconic acid, citraconic acid, crotonic acid, isocrotonic acid and the like; and unsaturated carboxylic anhydrides such as 2-octene-1-yl-succinic anhydride, 2-dodecene-1-yl-succinic anhydride, 2-octadecene-1-yl-succinic anhydride, maleic anhydride, 2,3-dimethyl maleic anhydride, bromomaleic anhydride, dichloromaleic anhydride, citraconic anhydride, itaconic anhydride, 1-butene-3,4-dicarboxylic anhydride, 1-cyclopentene-1,2-dicarboxylic anhydride, 1,2,3,6-tetrahydrophthalic anhydride, 3,4,5,6-tetrahydrophthalic anhydride, exo-3,6-epoxy-1,2,3,6-tetrahydrophthalic anhydride, 5-norbornene-2,3-dicarboxylic anhydride, methyl-5-norbornene-2,3-dicarboxylic anhydride, endo-bicyclo[2.2.2]oct-5-ene-2,3-dicarboxylic anhydride and bicyclo[2.2.2]oct-7-ene-2,3,5,6-tetracarboxylic anhydride. Among these, acid anhydrides are preferable since they have high reactivity.

The α,β-ethylenic unsaturated carboxylic acids can be appropriately selected according to kinds of copolymers containing a polyalkylene ether glycol segment to be modified and modification conditions, and may be used in combination of two or more species. In addition, the α,β-ethylenic unsaturated carboxylic acids may be used in the form of a solution obtained by dissolving these compounds in an organic solvent, or the like.

Examples of the radical generator include organic or inorganic peroxides such as t-butyl hydroperoxide, cumene hydroperoxide, 2,5-dimethylhexane-2,5-dihydroperoxide, 2,5-dimethyl-2,5-bis(t-butyloxy)hexane, 3,5,5-trimethylhexanonyl peroxide, t-butyl peroxybenzoate, benzoyl peroxide, dicumyl peroxide, 1,3-bis(t-butylperoxyisopropyl)benzene, dibutyl peroxide, methyl ethyl ketone peroxide, potassium peroxide and hydrogen peroxide; azo compounds such as 2,2'-azobisisobutylonitrile, 2,2'-azobis(isobutylamide)dihalide, 2,2'-azobis[2-methyl-N-(2-hydroxyethyl)propionamide] and azo-di-t-butane; carbon radical generators such as dicumyl; and the like.

The radical generator can be appropriately selected according to kinds of the polyester type elastomer and kinds of the α,β-ethylenic unsaturated carboxylic acid, which are used for the modification reaction, and the modification conditions, and can be used in combination of two or more species. Furthermore, the radical generators can be used in the form of a solution obtained by dissolving these compounds in an organic solvent, or the like.

A preferable lower limit of the amount of the α,β-ethylenic unsaturated carboxylic acids to be mixed is 0.01 part by weight with respect to 100 parts by weight of the polyester type elastomer, and a preferable upper limit is 30.0 parts by weight. When the amount is 0.01 part by weight or more, the modification reaction can be adequately performed, and when the amount is 30.0 parts by weight or less, the modified polyester type elastomer becomes economically advantageous. More preferably, the lower limit is 0.05 part by weight and the upper limit is 5.0 parts by weight, and furthermore preferably, the lower limit is 0.10 part by weight and the upper limit is 1.0 part by weight.

A preferable lower limit of the amount of the radical generator to be mixed is 0.001 part by weight with respect to 100 parts by weight of the polyester type elastomer, and a preferable upper limit of the amount is 3.00 parts by weight. When the amount is 0.001 part by weight or more, the modification reaction becomes apt to occur, and when the amount is 3.00 parts by weight or less, the deterioration of material strength due to a reduction in molecular weight (reduction in viscosity) at the time of modification becomes hard to occur. More preferably, the lower limit is 0.005 part by weight and the upper limit is 0.50 part by weight, furthermore preferably, the lower limit is 0.010 part by weight and the upper limit is 0.20 part by weight, and particularly preferably, the upper limit is 0.10 part by weight.

As the modification reaction for obtaining the modified polyester type elastomer, publicly known reaction methods such as a melt-kneading reaction method, a solution reaction method, a suspension-dispersion reaction method, and the like can be used, but the melt-kneading reaction method is generally preferable because of low cost.

In the melt-kneading reaction method, the above-mentioned respective components are uniformly mixed together at predetermined blending ratios and then the resulting mixture is melt-kneaded. In order to mix the respective components, a Henschel mixer, a ribbon blender, a v-blender, or the like can be used. In order to melt-knead the resulting mixture, a Banbury mixer, a kneader, a roll, a single-screw kneading extruder or a multi-screw kneading extruder such as twin-screw kneading extruder can be used.

A preferable lower limit of a kneading temperature at which the melt-kneading is performed is 100° C., and a preferable upper limit is 300° C. By setting the kneading temperature at a temperature within this range, the heat deterioration of a resin can be prevented. More preferably, the lower limit is 120° C., and the upper limit is 280° C., and furthermore preferably, the lower limit is 150° C., and the upper limit is 250° C.

A rubber component such as natural rubber, synthetic rubber (for example, polyisoprene rubber), and the like and a softening agent such as process oil may coexist with the modified polyester type elastomer. By coexistence of the softening agent, plasticization of the rubber component can be promoted and fluidity of the resulting thermoplastic resin composition can be improved. The softening agent may be any of paraffinic, naphthenic, and aromatic softening agents. Further, other components such as a resin, rubber, filler or additive other than those described above may be added to the resin components and rubber components within a range not impairing effects of the present invention.

Examples of the filler include calcium carbonate, talc, silica, kaolin, clay, diatom earth, calcium silicate, mica, asbestos, alumina, barium sulfate, aluminum sulfate, calcium sulfate, magnesium carbonate, carbon fiber, glass fiber, glass sphere, molybdenum sulfide, graphite, Shirasu-balloon, and the like.

Further, Examples of the additives include heat-resistant stabilizers, weather-resistant stabilizers, colorants, antistatic agents, flame retardants, nucleoators, lubricants, slip agents, anti-blocking agents, and the like.

As the heat-resistant stabilizer, publicly known heat-resistant stabilizers such as phenole heat-resistant stabilizers, phosphoric heat-resistant stabilizers and sulfuric heat-resistant stabilizers can be used. As the weather-resistant stabilizer, publicly known weather-resistant stabilizers such as hindered amine weather-resistant stabilizers and triazole weather-resistant stabilizers can be used. Examples of the colorant include carbon black, titanium white, zinc white, red iron oxide, azo compounds, nitroso compounds, phthalocyanine compounds, and the like. Further, for all of the antistatic agents, the flame retardants, the nucleoaagents, the lubricants, the slip agents and the anti-blocking agents, publicly known substances can be used.

A preferable lower limit of a modification ratio (grafting rate) of the modified polyester type elastomer is 0.01% by weight, and a preferable upper limit is 10.0% by weight. When the modification ratio is 0.01% by weight or more, affinity of the elastomer for a polyester becomes high, and when the modification ratio is 10.0% by weight or less, reduction in strength due to the deterioration of a molecule in modification can be reduced. More preferably, the lower limit is 0.03% by weight, and the upper limit is 7.0% by weight, and further more preferably, the lower limit is 0.05% by weight, and the upper limit is 5.0% by weight.

The modification ratio (grafting rate) of the modified polyester type elastomer can be determined according to the following equation (1) from spectrums obtained by $H^1$-NMR measurement. In addition, as equipment to be used for the $H^1$-NMR measurement, for example, "GSX-400" (manufactured by JEOL Ltd.) can be used.

$$\text{Grafting rate (weight \%)} = 100 \times (C/3 \times 98) / \{(A \times 148/4) + (B \times 72/4) + (C/3 \times 98)\} \quad (1)$$

In the above equation (1), A is an integral value in an integral range of 7.8 to 8.4 ppm, B is an integral value in an integral range of 1.2 to 2.2 ppm, and C is an integral value in an integral range of 2.4 to 2.9 ppm.

A preferable lower limit of a JIS-D hardness of a product containing the modified polyester type elastomer obtained by the modification reaction is 10, and a preferable upper limit is 80. When the JIS-D hardness is 10 or more, mechanical strength is improved, and when the JIS-D hardness is 80 or less, flexibility and impact resistance are improved. More preferably, the lower limit is 15, and the upper limit is 70, and furthermore preferably, the lower limit is 20, and the upper limit is 60. In addition, the JIS-D hardness can be measured by using durometer type-D through a method according to JIS K6235.

Examples of the polystyrene type resin composing the intermediate layer include an aromatic vinyl hydrocarbon-conjugated diene copolymer, a mixed resin of an aromatic vinyl hydrocarbon-conjugated diene copolymer and an aromatic vinyl hydrocarbon-aliphatic unsaturated carboxylic acid ester copolymer, and the like.

When the aromatic vinyl hydrocarbon-conjugated diene copolymer is used, the heat-shrinkable multilayer film becomes a heat-shrinkable multilayer film which is hardly broken in an atmosphere of low temperature and has excellent handleability.

Further, when the mixed resin of an aromatic vinyl hydrocarbon-conjugated diene copolymer and an aromatic vinyl hydrocarbon-aliphatic unsaturated carboxylic acid ester copolymer is used, the heat-shrinkable multilayer film becomes a heat-shrinkable multilayer film having excellent low temperature shrinkability.

The aromatic vinyl hydrocarbon-conjugated diene copolymer is not particularly limited, and examples of the aromatic vinyl hydrocarbon include styrene, o-methylstyrene, p-methylstyrene, and the like, and examples of the conjugated diene include 1,3-butadiene, 2-methyl-1,3-butadiene, 2,3-dimethyl-1,3-butadiene, 1,3-pentadiene, 1,3-hexadiene, and the like. These dienes may be used singly or in combination of two or more species. Among these, a styrene-butadiene-styrene copolymer (SBS resin) is suitable since this copolymer is superior particularly in low temperature shrinkability and tearing properties along the perforation. Further, in order to prepare a film with less-fish eye, it is preferable to use a styrene-isoprene-styrene copolymer (SIS resin), a styrene-isoprene-butadiene-styrene copolymer (SIBS resin), and the like, in which 2-methyl-1,3-butadiene (isoprene) is used as conjugated diene.

When the SBS resin, the SIS resin, or the SIBS resin is used as the aromatic vinyl hydrocarbon-conjugated diene copolymer, these resins may be used singly or in combination of two or more species. When these resins are used in combination of two or more species, resins may be dry-blended, or may be used as a compounded resin formed by kneading the resins in a specific composition with an extruder and pelletizing the extruded resin.

When such resins are used singly or in combination of two or more species, the composition preferably has a styrene content of 65 to 90% by weight and a conjugated diene content of 10 to 35% by weight. Resins having such a composition are superior particularly in low temperature shrinkability and tearing properties along the perforation. On the other hand, when the conjugated diene content is less than 10% by weight, the film tends to tear when tension is applied, and the film may break contingently in converting printing or using the film as a label. When the conjugated diene content is more than 35% by weight, extraneous substances such as gel may become apt to be produced in molding processing the film.

The aromatic vinyl hydrocarbon-aliphatic unsaturated carboxylic acid ester copolymer is not particularly limited, examples of the aromatic vinyl hydrocarbon include styrene, o-methylstyrene, p-methylstyrene, and the like, and examples of the unsaturated carboxylic acid ester include methylacrylate, ethylacrylate, propylacrylate, butylacrylate, methylmethacrylate, ethylmethacrylate, propylmethacrylate, butylmethacrylate, and the like. These copolymers may be used singly or in combination of two or more species.

When a styrene-butylacrylate copolymer is used as the aromatic vinyl hydrocarbon-aliphatic unsaturated carboxylic acid ester copolymer, substances having a styrene content of 60 to 90% by weight and a butylacrylate content of 10 to 40% by weight are preferably used. By using an aromatic vinyl hydrocarbon-aliphatic unsaturated carboxylic acid ester copolymer having such composition, a heat-shrinkable label having excellent low temperature resistance and excellent tearing properties along the perforation can be attained.

When a mixed resin of an aromatic vinyl hydrocarbon-conjugated diene copolymer and an aromatic vinyl hydrocarbon-aliphatic unsaturated carboxylic acid ester copolymer is used as the intermediate layer, a preferable lower limit of an amount of the aromatic vinyl hydrocarbon-conjugated diene copolymer to be mixed in the mixed resin is 20% by weight, and a preferable upper limit is 100% by weight. When the amount is less than 20% by weight, low temperature ductility becomes low and a heat-shrinkable label may be broken due to dropping it inadvertently during cold storage. The more preferable lower limit is 30% by weight.

In the heat-shrinkable multilayer film of the present invention, the intermediate layer preferably contains an ultraviolet absorber. By thus containing the ultraviolet absorber, it is possible to provide ultraviolet light blocking properties, and it is possible to prevent the deterioration of the contents of a container to enhance a storage property since particularly a property of blocking ultraviolet light (a wavelength 380 nm or shorter) emitted from solar light or a fluorescent lamp is excellent.

Further, by containing the ultraviolet absorber in only the intermediate layer comprising a polystyrene type resin, problems such as heat deterioration and roll contamination in containing the ultraviolet absorber in the polyester type resin can be solved. Further, since a desired ultraviolet light blocking property can be achieved even when the content of the ultraviolet absorber is low, the heat-shrinkable multilayer film of the present invention becomes advantageous in the cost.

The ultraviolet absorber is not particularly limited, and examples of the ultraviolet absorber include benzophenone type ultraviolet absorbers such as 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, and 2-hydroxy-4-n-octoxybenzophenone; benzotriazole type ultraviolet absorbers such as 2-(2'-hydroxy-4'-n-octoxyphenyl)benzotriazole, 2-(2'-hydroxy-5'-n-methoxyphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-t-octylphenyl)benzotriazole, and 2-[2'-hydroxy-3'-(3",4",5",6"-tetrahydrophthalimidemeth yl)-5'-methylphenyl]benzotriazole; benzoate type ultraviolet absorbers such as 2,4-di-t-butylphenyl-3,5-di-t-butyl-4-hydroxybenzoate; salicylate type ultraviolet absorbers such as p-t-butylphenylsalicylate; cyanoacrylate type ultraviolet absorber such as ethyl-2-cyano-3,3-diphenyl acrylate, and octyl-2-cyano-3,3-diphenyl acrylate; and the like.

Among these, 2-(2'-hydroxy-5'-n-methoxyphenyl)benzotriazole, and 2-(2'-hydroxy-3'-t-butyl-5'-methylphenyl)-5-chlorobenzotriazole are preferable since they have excellent balance between ultraviolet light absorbency and heat resistance.

A preferable lower limit of the content of the ultraviolet absorber, depending on the thickness of the intermediate layer, is 1 part by weight with respect to 100 parts by weight of materials, such as a base resin, and a recycle material, composing an intermediate layer, and a preferable upper limit is 10 parts by weight. When the content is less than 1 part by weight, ultraviolet light blocking properties become inadequate and there may be cases where a resin film cannot prevent the deterioration of the contents of a container in using the resin film as a heat-shrinkable label of a container, and when the content is more than 10 parts by weight, mechanical strength of the heat-shrinkable multilayer film is decreased and break of the film may occur in converting printing or using the resin film as a heat-shrinkable label. The more preferable lower limit of the content of the ultraviolet absorber is 2 parts by weight and the more preferable upper limit is 8 parts by weight.

The polyester type resin composing the outer surface layers can be prepared by polycondensating dicarboxylic acid with diol.

The dicarboxylic acid is not particularly limited, and examples of the dicarboxylic acid include o-phthalic acid, terephthalic acid, isophthalic acid, succinic acid, adipic acid, sebacic acid, azelaic acid, octylsuccinic acid, cyclohexanedicarboxylic acid, naphthalenedicarboxylic acid, fumaric acid, maleic acid, itaconic acid, and decamethylenecarboxylic acid, and anhydrides and lower alkyl esters thereof.

The diol is not particularly limited, and examples of the diol include aliphatic diols such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol(2,2-dimethylpropane-1,3-diol), 1,2-hexanediol, 2,5-hexanediol, 2-methyl-2,4-pentanediol, 3-methyl-1,3-pentanediol, and 2-ethyl-1,3-hexanediol; alicyclic diols such as 2,2-bis(4-hydroxycyclohexyl)propane, alkylene oxide addition product of 2,2-bis(4-hydroxycyclohexyl)propane, 1,4-cyclohexanediol, and 1,4-cyclohexanedimethanol; and the like.

As the polyester type resin, in particular, substances, which contain a component derived from terephthalic acid as a dicarboxylic acid component and a component derived from ethylene glycol and 1,4-cyclohexanedimethanol as a diol component, are suitable. By using such polyester type resins, it is possible to impart particularly high heat resistance and solvent resistance to the resulting heat-shrinkable multilayer film of the present invention.

Further, when particularly high heat resistance and solvent resistance are imparted, substances having a content of an ethylene glycol-derived component of 60 to 80% by mole and a content of a 1,4-cyclohexanedimethanol-derived component of 10 to 40% by mole are preferably used. These polyester type resins may further contain 0 to 20% by mole of a diethylene glycol-derived component.

As the polyester type resin composing the outer surface layers, polyester type resins having the composition described above may be used singly, or polyester type resins having the composition described above may be used in combination of two or more species.

As the polyester type resin, a resin having a melting temperature of a crystal of 240° C. or lower is preferably used. In the production of the heat-shrinkable label, it is commonly carried out to reuse trimming pieces of drawing selvage and recycle films as a recycle material. Generally, such recycle materials are mixed with polystyrene type resins as a material for the intermediate layer, but since the polystyrene type resin and the polyester type resin are different in properties such as a melting point, there may be cases where the polyester type resin is extruded in an unmelted state when a film is formed at a temperature suitable for molding the polystyrene type resin. However, by using a polyester type resin having a relatively low melting temperature of a crystal or not having a melting temperature of a crystal, it is possible to prevent an unmelted substance of the polyester type resin from being produced as an extraneous substance in a formed film. On the other hand, when the melting temperature of a crystal is higher than 240° C., an unmelted substance of the polyester type resin may remain as an extraneous substance in the film to cause defective conditions such as defective appearance, defective printing by intermittence of ink during printing in the case of molding the resin as a recycle material. The melting temperature of a crystal is more preferably 220° C. or lower.

Additives such as antioxidants, thermal stabilizers, lubricants, antistatic agents, or antiblocking agents may be added to the heat-shrinkable multilayer film of the present invention as required. Generation of gel can be inhibited by adding particularly the thermal stabilizer or the antioxidant.

When the thickness of the entire heat-shrinkable multilayer film is 45 μm, a preferable lower limit of a thickness of the intermediate layer is 22 μm, and a preferable upper limit is 37 μm. When the thickness is less than 22 μm, adequate tearing properties along the perforation may not be attained, and when the thickness is more than 37 μm, adequate heat resistance may not be attained. The more preferable lower limit is 26 μm, and the more preferable upper limit is 36 μm.

A preferable lower limit of a thickness of the outer surface layer is 3 μm, and a preferable upper limit is 10 μm. When the thickness is less than 3 μm, adequate oil resistance or low temperature resistance may not be attained, and when the thickness is more than 10 μm, adequate tearing properties along the perforation may not be attained. The more preferable lower limit is 4 μm, and the more preferable upper limit is 8 μm.

A preferable lower limit of a thickness of the adhesive layer is 0.7 μm, and a preferable upper limit is 1.5 μm. When the thickness is less than 0.7 μm, adequate adhesion strength may not be attained, and when the thickness is more than 1.5 μm, a heat-shrinkage property may be deteriorated. The more preferable lower limit is 0.8 μm, and the more preferable upper limit is 1.3 μm.

A preferable lower limit of a thickness of the entire heat-shrinkable multilayer film of the present invention is 30 μm, and a preferable upper limit is 60 μm. When the thickness of the entire heat-shrinkable multilayer film is within the above-mentioned range, the heat-shrinkable multilayer film of the present invention becomes economically advantageous and easy to handle. The thickness of the entire film is preferably set at 30 to 60 μm by setting a thickness of each layer at 3 to 10 μm and increasing/decreasing thicknesses of the intermediate layer and the adhesive layer.

With respect to the heat-shrinkage property of the heat-shrinkable multilayer resin film of the present invention, preferably, a heat shrinkage percentage of the film obtained by immerse in hot water at 70° C. for 10 seconds in a maximum shrinkage direction (a direction, in which shrinkage is larger, of a longitudinal direction and a transverse direction) is 10 to 50%, and a heat shrinkage percentage in hot water at 80° C. for 10 seconds is 25 to 80%. In addition, the heat-shrinkage percentage is a value of a ratio of an amount of the shrinkage to an original film dimension before shrinkage represented by percentage in the case where the heat-shrinkable multilayer film is cut off in a size of 100 mm×100 mm and immersed in a hot water bath at 70° C. or 80° C. for 10 seconds. Further, the longitudinal direction refers to a direction orthogonal to a main stretching direction and the transverse direction refers to a main stretching direction.

A method of producing the heat-shrinkable multilayer resin film of the present invention is not particularly limited, but a method of molding the respective layers simultaneously by a co-extrusion process is suitable. For example, in the co-extrusion through a T-die, a method of lamination may be any of a feed block method, a multi-manifold method, and a combined method thereof. Specifically, for example, a method, in which a polyester type resin as a resin composing an outer surface layer, a polystyrene type resin as a resin composing an intermediate layer and a polyester type elastomer or a modified polyester type elastomer as a resin composing an adhesive layer were respectively charged into an extruder, extruded from a multilayer die in the form of sheet, quenched/solidified with a take-off roll, and then monoaxially or biaxially stretched, can be employed. A stretching temperature has to be changed according to a softening temperature of a resin composing a film or a shrinkage property required of the heat-shrinkable multilayer film, and a preferable lower limit of the stretching temperature is 75° C. and a preferable upper limit is 120° C., and a more preferable lower limit is 80° C. and a more preferable upper limit is 115° C.

A heat-shrinkable label can be obtained by using the heat-shrinkable multilayer film of the present invention as a base film. Such a heat-shrinkable label also constitutes the present invention.

The heat-shrinkable label of the present invention may be prepared by using the heat-shrinkable multilayer film as a base film, and laminating other layers such as a printing layer on the base film as required.

As a method of covering the container with the heat-shrinkable label, generally, a method, in which a heat-shrinkable film is bonded along both edges with a solvent to process the heat-shrinkable film into a tubular form (center seal processing) to form a heat-shrinkable label and then the film is heated with the container covered with the film to shrink the film, is adopted.

Figure 2:
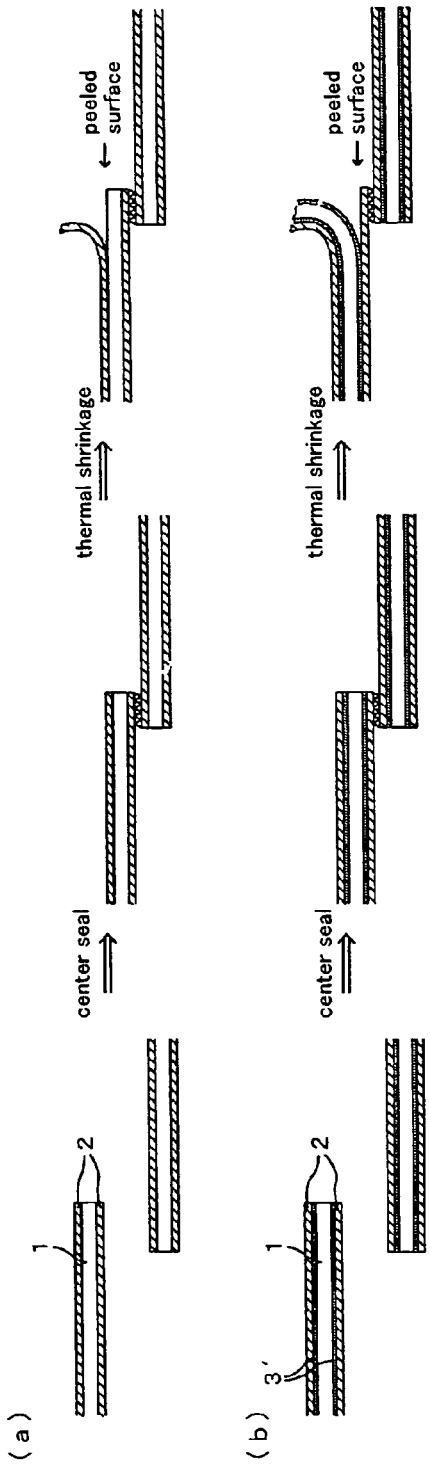
FIG. 2(a) is a schematic view showing the states of and around the center seal portion in succession of covering steps in employing conventional heat-shrinkable labels comprising a multilayer film as a base film, where peeling occurs between an intermediate layer 1 and an outer surface layer 2.
FIG. 2(b) is a schematic view showing the states of and around the center seal portion in succession of covering steps in employing conventional heat-shrinkable labels comprising a multilayer film as a base film, where peeling occurs between the outer surface layer 2 and an adhesive layer 3'.

FIG. 1 is a schematic view showing the states of and around a center seal portion in succession of covering steps in employing the heat-shrinkable label of the present invention, and FIG. 2 is a schematic view showing the states of and around the center seal portion in succession of covering steps in employing conventional heat-shrinkable labels comprising a multilayer film as a base film.

The present inventors investigated the conditions of covering defects in the case of using conventional heat-shrinkable labels comprising multilayer films as a base film, and consequently they found that in the heat-shrinkable label described in Patent Document 2, after center sealing and then a film is shrunk by heat, if the films rub against each other during transportation of products or the film is scratched with a fingernail or a body, peeling occurs between an intermediate layer 1 and an outer surface layer 2, as shown in FIG. 2(a) (for convenience of comparison, in FIG. 2(a), peeling occurs at a film edge, but in actual, peeling can occur not only at the film edge but also in a central portion). Further, they found that in the heat-shrinkable label comprising a heat-shrinkable film described in Patent Document 1, after center sealing, peeling occurs between the outer surface layer 2 and an adhesive layer 3' on the center seal side when the film is shrunk by heat, as shown in FIG. 2(b).

In the heat-shrinkable label described in Patent Document 2, the outer surface layers 2 are laminated directly on the intermediate layer 1 without the adhesive layer interposed between the outer surface layer and the intermediate layer. In Patent Document 2, it is thought that affinity between the intermediate layer 1 and the outer surface layers 2 is enhanced to increase adhesion strength by using an outer surface layers comprising a polyester type resin comprising a specific monomer, but it is thought that in practice, the adhesion strength between the layers is not high and peeling occurred between the intermediate layer 1 and the outer surface layer 2.

On the other hand, in the heat-shrinkable film described in Patent Document 1, since the outer surface layers 2 are laminated on the intermediate layer 1 with the adhesive layer 3' comprising an olefin type resin interposed between the outer surface layer 2 and the intermediate layer 1, the adhesion strength between the layers is supposed to be high. In the center seal method, both edges of the heat-shrinkable film are bonded to each other with a solvent. At this time, a solvent, in which a polyester type resin used in the outer surface layer is dissolved, is used as an solvent, and the outer surface layer is bonded to the intermediate layer by dissolving a part of the outer surface layer. The olefin type resin used as an adhesive layer in Patent Document 1 has extremely high solvent resistance against a solvent which dissolves polyester type resins and is hardly dissolved in or swelled with a solvent. Therefore, it is thought that even when a part of the outer surface layer is dissolved at the time of center sealing, the solvent does not permeate into the heat-shrinkable label, and an adhesive force between the dissolved outer surface layer and the inner adhesive layer is decreased, and peeling occurred between the outer surface layer 1 and the adhesive layer 3' when stress is applied during heat-shrinking.

On the other hand, in the heat-shrinkable label of the present invention, the delamination did not occur, as shown in FIG. 1, even in heat-shrinking the heat-shrinkable label after center sealing.

In the heat-shrinkable label of the present invention, since the outer surface layers 2 are laminated on the intermediate layer 1 with the adhesive layer 3 comprising a polyester type elastomer or a modified polyester type elastomer interposed between the outer surface layer 2 and the intermediate layer 1, the adhesion strength between these layers is extremely high. Since the resin composing this adhesive layer 3 is dissolved in or swelled with a solvent which dissolves polyester type resins, the solvent can permeate into the heat-shrinkable label at the time of center sealing and the adhesion is performed as a whole. Accordingly, an adhesive force between the layers is more improved at the center seal portion and therefore the delamination is assumed not to occur.

Effect of the Invention

In accordance with the present invention, it is possible to provide a heat-shrinkable multilayer film which, in the case of using the heat-shrinkable multilayer film as a heat-shrinkable label for a container, does not produce delamination in covering a container, is superior in heat resistance, oil resistance, tearing properties along the perforation and appearance and can prevent the reduction in strength between the layers after a printing step, and a heat-shrinkable label comprising the heat-shrinkable multilayer film as a base film.

BEST MODE FOR CARRYING OUT THE INVENTION

Hereinafter, the present invention will be described in more detail by way of examples, but the present invention is not limited to these examples.

Example 1

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As a resin composing an intermediate layer, a styrene-butadiene copolymer (styrene: 78% by weight, butadiene: 22% by weight, Vicat softening point: 72° C., MFR: 5.6 g/10 minutes) was used.

As a resin composing an adhesive layer, a polyester type elastomer (produced by Mitsubishi Chemical Corp., PRIMALLOY A1600N, melting point: 160° C., MFR: 5.0 g/10 minutes) was used.

These resins were charged into an extruder whose barrel temperature was 160 to 250° C., extruded from a multilayer die of 250° C. in the form of sheet, and quenched/solidified with a take-off roll of 25° C. Then, the extruded resin sheet was stretched by 6 times in a tenter stretching machine in which temperatures of a preheating zone, a stretching zone and a fixing zone were 110° C., 90° C. and 80° C., respectively, and then the stretched resin was wound up with a winder, and thereby a heat-shrinkable multilayer film was obtained. The resulting heat-shrinkable multilayer film had an overall thickness of 45 μm and had a five-layer structure an outer surface layer (6 μm)/an adhesive layer (1 μm)/an intermediate layer (31 μm)/an adhesive layer (1 μm)/an outer surface layer (6 μm).

Example 2

Using the heat-shrinkable multilayer film obtained in Example 1 and printing inks of two colors, white and indigo blue, in which a solvent comprises a mixed solvent of 100 parts by weight of water, 200 parts by weight of ethyl alcohol and 2 parts by weight of n-methylpyrrolidone and a vehicle comprises a water-soluble acrylic resin, two-color printing on one surface of the heat-shrinkable multilayer film was performed with a gravure printing machine. As a printing pattern, a lattice pattern, in which nonprinting portions of 4 mm in width are discretely located in a direction of the heat-shrinkable multilayer film flow, was employed.

Then, the heat-shrinkable multilayer film was set in such a way that the printed surface becomes inner and center sealed with both edges overlapped so as to have the form of tube having a lay flat width of 107 mm with a mixed solvent of 100 parts by weight of 1,3-dioxolane and 50 parts by weight of cyclohexane, and the tubular film was folded to obtain a tubular heat-shrinkable label.

Comparative Example 1

A heat-shrinkable multilayer film was prepared in a similar manner to Example 1 except that polybutylene terephthalate (produced by WinTec Polymer Ltd., DURANEX 500FP) was used as a resin composing an adhesive layer.

Comparative Example 2

A heat-shrinkable film having a thickness of 45 μm was prepared in a similar manner to Example 1 except that a monolayer heat-shrinkable film was obtained using a polyester type resin which uses terephthalic acid as a dicarboxylic acid component and contains 67% by mole of a component derived from ethylene glycol and 33% by mole of a component derived from 1,4-cyclohexanedimethanol as a diol component.

Comparative Example 3

A heat-shrinkable film having a thickness of 45 μm was prepared in a similar manner to Example 1 except that a monolayer heat-shrinkable film was obtained using a styrene-butadiene copolymer (styrene: 78% by weight, butadiene: 22% by weight, Vicat softening point: 72° C., MFR: 5.6 g/10 minutes)

Comparative Example 4

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As a resin composing an intermediate layer, a styrene-butadiene copolymer (styrene: 78% by weight, butadiene: 22% by weight, Vicat softening point: 72° C., MFR: 5.6 g/10 minutes) was used.

As a resin composing an adhesive layer, maleic anhydride modified linear low density polyethylene (LLDPE) was used.

A heat-shrinkable multilayer film having a five-layer structure of an outer surface layer (6 μm)/an adhesive layer (1 μm)/an intermediate layer (31 μm)/an adhesive layer (1 μm)/an outer surface layer (6 μm) was prepared in a similar manner to Example 1 using these resins.

Comparative Example 5

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As a resin composing an intermediate layer, a styrene-butadiene copolymer (styrene: 78% by weight, butadiene: 22% by weight, Vicat softening point: 72° C., MFR: 5.6 g/10 minutes) was used.

A heat-shrinkable multilayer film having a three-layer structure of an outer surface layer (6 μm)/an intermediate layer (33 μm)/an outer surface layer (6 μm) was prepared in a similar manner to Example 1 using these resins.

Comparative Example 6

A heat-shrinkable multilayer film having a thickness of 45 μm was prepared in a similar manner to Example 1 except that as a resin composing an adhesive layer, a mixed resin of 50% by weight of a styrene-butadiene copolymer and 50% by weight of a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

Experiment Example 1

A heat-shrinkable multilayer film was prepared in a similar manner to Example 1 except that a hydrogen addition product of a maleic anhydride modified styrene-butadiene block copolymer (styrene content: 30% by weight, maleic anhydride addition rate: 0.5% by weight, MFR: 4.0 g/10 minutes, specific gravity: 0.91) was used as a resin composing an adhesive layer.

(Evaluation)

The heat-shrinkable label obtained in Example 2 and the heat-shrinkable labels obtained by the same method as in Example 2 using the heat-shrinkable films obtained in Comparative Examples and Experiment Example were evaluated for a covering property and appearance, heat resistance, tearing properties along the perforation and oil resistance according to the following methods.

Further, the heat-shrinkable films obtained in Example 1, Comparative Examples 1, 4 to 6 and Experiment Example 1 were evaluated for strength between layers before and after printing processing according to the following method.

The results of the evaluation are shown in Table 1.

(1) Covering Property and Appearance

The obtained heat-shrinkable label was put around a 500 ml cylindrical (polygonal column-shaped) PET bottle having a diameter of about 65 mm, and the label was shrunk at a set temperature of 80-85-95° C. at a transit time in the tunnel of 8 seconds using a steam tunnel "SH-5000" manufactured by Fuji Astec, Inc., to cover the bottle. In addition, the perforation was previously provided for each heat-shrinkable label.

After hundred PET bottles were covered with the heat-shrinkable labels, the heat-shrinkable labels were scratched with a fingernail and thereafter, conditions in the entire heat-shrinkable label covering the PET bottle were visually observed with a focus on a center seal portion, and a covering property and appearance were rated according to the following criteria.

0: There were no delamination nor crinkles.

x: There was at least one delaminations or crinkle.

(2) Heat Resistance

After thirty PET bottles (one which the heat-shrinkable label can cover without producing delaminations or crinkles) covered with the obtained heat-shrinkable label were left at rest on a hot plate kept at 130° C. for 15 minutes, the condition of each heat-shrinkable label was visually observed to evaluate the heat resistance according to the following criteria.

o: There were no crinkles nor breaks in the heat-shrinkable label.

x: There was at least one crinkle or break in the heat-shrinkable label.

(3) Tearing Property Along Perforation

The heat-shrinkable labels of thirty PET bottles (one which the heat-shrinkable label can cover without producing delaminations or crinkles) covered with the obtained heat-shrinkable label were torn off along the perforation with a hand. The conditions in doing so were observed to evaluate the tearing property along the perforation according to the following criteria.

o: The heat-shrinkable labels could be easily torn off along the perforation.

x: Some heat-shrinkable labels are hard to tear off along the perforation.

(4) Oil Resistance

After an edible oil was applied onto each heat-shrinkable label of thirty PET bottles (one which the heat-shrinkable label can cover without producing delaminations or crinkles) covered with the obtained heat-shrinkable label, the condition of the heat-shrinkable label was visually observed to evaluate the oil resistance according to the following criteria.

o: There were no crinkles nor breaks in the heat-shrinkable label.

x: There was at least one crinkle or break in the heat-shrinkable label.

(5) Strength between Layers before and after Printing

Endless printing by a gravure printing method was performed on the obtained heat-shrinkable multilayer film (film width: 500 mm) under the following conditions.

Ink used: New LPSuper white (produced by TOYO INK MFG. Co., Ltd.)

Ink viscosity: 17 seconds at Zahn Viscosity Cup Type III (Zahn Cup Method)

Printing plate: plate prepared by a direct laser plate-making in which a plate depth is 30 μm and number of line is 175

Number of printings: three times

Printing speed: 150 m/min

Figure 3:
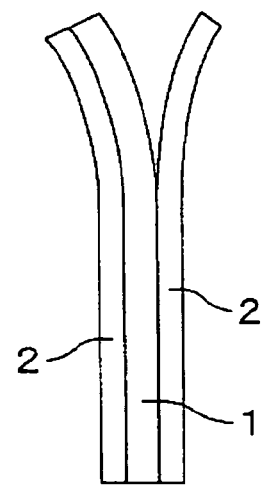
FIG. 3 is a schematic view showing a state of a peeled film in the evaluation of the strength between layers before and after printing.

After the completion of gravure printing, samples of appropriate size were cut off from arbitrary ten locations in an area, in which white color was printed, of the obtained printed film. Thereafter, a layer including the outer surface layer is designated as a peeling layer and a layer including the intermediate layer is designated as a layer from which the peeling layer peels off, and the delamination of a part of a film edge was performed as shown in FIG. 3, and then samples having a size of 10 mm in length and 100 mm in width for measuring were cut off. Incidentally, "length" of the sample means a direction of a film flow and "width" means a direction of width.

Figure 4:
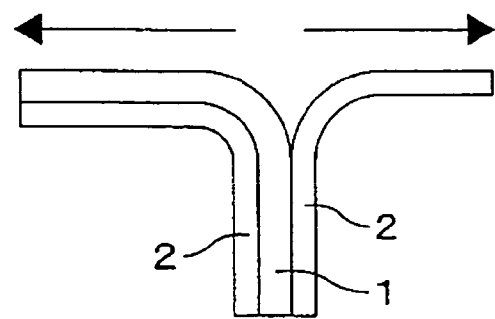
FIG. 4 is a schematic view showing a state of a peeled film in the evaluations of the strength between layers and the strength between layers (adhesion) before and after printing.

Further, strength at the time of peeling the obtained sample at a tensile speed of 200 mm/min in a direction of 180 degrees as shown in FIG. 4 was measured with a peeling tester (Peeling TESTER HEIDON-17 manufactured by Shinto Scientific Co., Ltd.). Incidentally, the adhesive layer was omitted in FIGS. 3 and 4.

obtained. The resulting heat-shrinkable multilayer film had an overall thickness of 45 μm and had a five-layer structure an outer surface layer (6 μm)/an adhesive layer (1 μm)/an intermediate layer (31 nm)/an adhesive layer (1 μm)/an outer surface layer (6 μm).

Example 4

As a resin composing an outer surface layer, a polyester type resin, which uses terephthalic acid as a dicarboxylic acid component and contains 70% by mole of a component derived from ethylene glycol and 30% by mole of a component derived from neopentyl glycol as a diol component, was used.

As a resin composing an intermediate layer, a mixture prepared by adding 3.0 parts by weight of 2-(2'-hydroxy-3'-t-butyl-5'-methylphenyl)-5-chlorobenzotriazole as an ultraviolet absorber to a mixed resin of 50 parts by weight of a

TABLE 1

| | Covering property and appearance | Heat resistance | Tearing property | Oil resistance | Strength between layers (N/10 mm) Before printing | After printing |
|---|---|---|---|---|---|---|
| Example 1 | — | — | — | — | 1.3 | 1.2 |
| Example 2 | ○ | ○ | ○ | ○ | — | — |
| Comparative Example 1 | x | ○ | ○ | ○ | 0.4 | 0.3 |
| Comparative Example 2 | x | ○ | x | ○ | — | — |
| Comparative Example 3 | ○ | x | ○ | x | — | — |
| Comparative Example 4 | x | ○ | ○ | ○ | 0.7 | 0.5 |
| Comparative Example 5 | x | ○ | ○ | ○ | 0.2 | 0.2 |
| Comparative Example 6 | x | ○ | ○ | ○ | 0.3 | 0.3 |
| Experiment Example 1 | ○ | ○ | ○ | ○ | 1.2 | 0.8 |

Example 3

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As a resin composing an intermediate layer, a mixture prepared by adding 2.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

As a resin composing an adhesive layer, a polyester type elastomer (produced by Mitsubishi Chemical Corp., PRIMALLOY A1600N, melting point: 160° C., MFR: 5.0 g/10 minutes) was used.

These resins were charged into an extruder whose barrel temperature was 160 to 250° C., extruded from a multilayer die of 250° C. in the form of sheet, and quenched/solidified with a take-off roll of 30° C. Then, the extruded resin sheet was stretched by 6 times in a tenter stretching machine in which temperatures of a preheating zone, a stretching zone and a thermally fixing zone were 110° C., 90° C. and 80° C., respectively, and then the stretched resin was wound up with a winder, and thereby a heat-shrinkable multilayer film was styrene-butyl acrylate copolymer (styrene: 82% by weight, butyl acrylate: 18% by weight, Vicat softening point: 62° C., MFR: 5.5 g/10 minutes) and 50 parts by weight of a styrene-butadiene copolymer (styrene: 77% by weight, butadiene: 23% by weight, Vicat softening point: 82° C., MFR: 6.0 g/10 minutes) was used.

As a resin composing an adhesive layer, a polyester type elastomer (produced by Mitsubishi Chemical Corp., PRIMALLOY A1600N, melting point: 160° C., MFR: 5.0 g/10 minutes) was used.

A heat-shrinkable multilayer film having a five-layer structure of an outer surface layer (6 μm)/an adhesive layer (1 μm)/an intermediate layer (31 μm)/an adhesive layer (1 μm)/an outer surface layer (6 μm) was prepared in a similar manner to Example 3 using these resins.

Comparative Example 7

As a resin composing an outer surface layer, a polystyrene type resin comprising a styrene-butadiene copolymer (styrene: 78% by weight, butadiene: 22% by weight, Vicat softening point: 72° C., MFR: 5.6 g/10 minutes) was used.

As a resin composing an intermediate layer, a mixture prepared by adding 2.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

A heat-shrinkable multilayer film having a three-layer structure of an outer surface layer (7 μm)/an intermediate layer (31 μm)/an outer surface layer (7 μm) was prepared in a similar manner to Example 3 using these resins.

Comparative Example 8

As a resin composing an outer surface layer, a polystyrene type resin comprising a styrene-butadiene copolymer (styrene: 78% by weight, butadiene: 22% by weight, Vicat softening point: 72° C., MFR: 5.6 g/10 minutes) was used.

As a resin composing an intermediate layer, a mixture prepared by adding 7.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

A heat-shrinkable multilayer film having a three-layer structure of an outer surface layer (7 μm)/an intermediate layer (31 μm)/an outer surface layer (7 μm) was prepared in a similar manner to Example 3 using these resins.

Comparative Example 9

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As a resin composing an intermediate layer, a mixture prepared by adding 2.5 parts by weight of 2-(2'-hydroxy-3'-t-butyl-5'-methylphenyl)-5-chlorobenzotriazole as an ultraviolet absorber to 100 parts by weight of a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

A heat-shrinkable multilayer film having a three-layer structure of an outer surface layer (7 μm)/an intermediate layer (31 μm)/an outer surface layer (7 μm) was prepared in a similar manner to Example 3 using these resins.

Experiment Example 2

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As a resin composing an intermediate layer, a mixture prepared by adding 2.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

A heat-shrinkable multilayer film having a three-layer structure of an outer surface layer (7 μm)/an intermediate layer (31 μm)/an outer surface layer (7 μm) was prepared in a similar manner to Example 3 using these resins.

(Evaluation)

The heat-shrinkable multilayer films produced in Examples 3 and 4, Comparative Examples 7 to 9 and Experiment Example 2 were evaluated according to the following method. The results of the evaluation are shown in Table 2.

(6) Ultraviolet Light Transmittance

On the obtained heat-shrinkable multilayer films, an ultraviolet light (wavelength: 200 to 380 nm) transmittance was measured with a spectrophotometer (Model U-3410, manufactured by Hitachi, Ltd.). A scanning speed was set at 120 nm/min. Incidentally, if the ultraviolet light transmittance is less than 1% at all wavelengths in a range of 200 to 380 nm, it is thought that the heat-shrinkable multilayer film has an adequate ultraviolet light blocking property. Further, a maximum value of the ultraviolet light transmittance at a wavelength of 200 to 380 nm is shown in Table 2.

(7) Presence or Absence of Bleed out

After the obtained heat-shrinkable multilayer films were stored in an atmosphere of 23° C. and 55% in a relative humidity for a week right from film formation, the presence or absence of bleed out was verified by wiping the surface of the film with a finger to evaluate it according to the following criteria.

o: There was no substance adhering to the finger.

x: There was a powder substance adhering to the finger.

(8) Contamination of Roll

After the completion of co-extrusion, contamination of a quenching roll of a take-off unit was visually observed to evaluate whether clouding resulting from the bleed of the ultraviolet absorber exists or not.

o: There was no clouding.

x: There was clouding.

(9) Tearing Property Along Perforation

The heat-shrinkable multilayer films were slitted to a width of 223 mm and enter sealed with both edges overlapped so as to have the form of tube having a lay flat width of 107 mm with a mixed solvent of 100 parts by weight of 1,3-dioxolane and 50 parts by weight of cyclohexane, and the resulting tubular film was folded to obtain a tubular heat-shrinkable label.

Next, the heat-shrinkable labels of thirty PET bottles (one which the heat-shrinkable label can cover without producing delaminations or crinkles) covered with the heat-shrinkable label using a steam tunnel were torn off along the perforation with a hand. The conditions in doing so were observed to evaluate the tearing property along the perforation according to the following criteria.

o: The heat-shrinkable labels could be easily torn off along the perforation.

x: Some heat-shrinkable labels are hard to tear off along the perforation.

(10) Oil Resistance

After an edible oil was applied onto each heat-shrinkable label of thirty containers covered with the heat-shrinkable label in the same manner as in the paragraph (9), the condition of the heat-shrinkable label was visually observed to evaluate the oil resistance according to the following criteria.

o: There were no crinkles nor breaks in the heat-shrinkable label.

x: There were crinkles or breaks in the heat-shrinkable label.

(11) Strength between Layers (Adhesion)

The heat-shrinkable multilayer films were cut into a size of 100 mm in length and 10 mm in width, and strength at the time of peeling the resulting film at a tensile speed of 200 mm/min in a direction of 180 degrees as shown in FIG. 4 was measured with a peeling tester (Peeling TESTER HEIDON-17 manufactured by Shinto Scientific Co., Ltd.). Adhesion between the intermediate layer and the outer surface layer was evaluated according to the following criteria. Incidentally, the adhesive layer was omitted in FIG. 4.

o: Strength between layers is 0.5 N/10 mm or more.

x: Strength between layers is less than 0.5 N/10 mm.

TABLE 2

|  | Ultraviolet light transmittance (%) (wavelength in 200 to 380 nm at which transmittance is maximum) | Presence or absence of bleed out | Contamination of roll | Tearing property along perforation | Oil resistance | Adhesion |
| --- | --- | --- | --- | --- | --- | --- |
| Example 3 | 0.3 (380 nm) | ○ | ○ | ○ | ○ | ○ |
| Example 4 | 0.7 (380 nm) | ○ | ○ | ○ | ○ | ○ |
| Comparative Example 7 | 2.3 (280 nm) | ○ | ○ | ○ | x | — |
| Comparative Example 8 | 0 | x | ○ | ○ | x | — |
| Comparative Example 9 | 1.3 (380 nm) | ○ | x | x | ○ | — |
| Experiment Example 2 | 0.2 (380 nm) | ○ | ○ | ○ | ○ | x |

—: unmeasurable

Example 5

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As a resin composing an intermediate layer, a styrene-butadiene copolymer (styrene: 78% by weight, butadiene: 22% by weight, Vicat softening point: 72° C., MFR: 5.6 g/10 minutes) was used.

As a resin composing an adhesive layer, a modified polyester type elastomer, which was prepared by reacting a mixture of 80 parts by weight of a polyester elastomer containing 65 parts by weight of poly(tetramethylene ether) glycol having a number average molecular weight of 2000 and 20 parts by weight of a hydrogenated styrene-butadiene-styrene block copolymer (produced by Clayton Polymer Japan Co., Ltd., G-1641H) with 0.5 part by weight of maleic anhydride and 0.15 part by weight of NYPER BMT-K40 (produced by NOF Corp.) at 230° C., was used.

These resins were charged into an extruder whose barrel temperature was 160 to 230° C., extruded from a multilayer die of 250° C. in the form of sheet, and quenched/solidified with a take-off roll of 25° C. Then, the extruded resin sheet was stretched by 6 times in a tenter stretching machine in which temperatures of a preheating zone, a stretching zone and a fixing zone were 110° C., 90° C. and 80° C., respectively, and then the stretched resin was wound up with a winder, and thereby a heat-shrinkable multilayer film was obtained. The resulting heat-shrinkable multilayer film had an overall thickness of 45 μm and had a five-layer structure an outer surface layer (6 μm)/an adhesive layer (1 μm)/an intermediate layer (31 μm)/an adhesive layer (1 μm)/an outer surface layer (6 μm).

Example 6

Using the heat-shrinkable multilayer film obtained in Example 5 and printing inks of two colors, white and indigo blue, in which a solvent comprises a mixed solvent of 100 parts by weight of water, 200 parts by weight of ethyl alcohol and 2 parts by weight of n-methylpyrrolidone and a vehicle comprises a water-soluble acrylic resin, two-color printing on one surface of the heat-shrinkable multilayer film was performed with a gravure printing machine. As a printing pattern, a lattice pattern, in which nonprinting portions of 4 mm in width are discretely located in a direction of the heat-shrinkable multilayer film flow, was employed.

Then, the heat-shrinkable multilayer film was set in such a way that the printed surface becomes inner and center sealed with both edges overlapped so as to have the form of tube having a lay flat width of 107 mm with a mixed solvent of 100 parts by weight of 1,3-dioxolane and 50 parts by weight of cyclohexane, and the tubular film was folded to obtain a tubular heat-shrinkable label.

Example 7

A heat-shrinkable multilayer film was prepared in a similar manner to Example 5 except that as a resin composing an outer surface layer, a polyester type resin, which uses terephthalic acid as a dicarboxylic acid component and contains 70% by mole of a component derived from ethylene glycol, 20% by mole of a component derived from 1,4-cyclohexanedimethanol as a diol component and 10% by mole of a component derived from diethylene glycol, was used.

Example 8

A tubiform heat-shrinkable label was prepared in a similar manner to Example 6 except that the heat-shrinkable multilayer film obtained in Example 7 was used.

Example 9

As a resin composing an outer surface layer, a polyester type resin, which uses terephthalic acid as a dicarboxylic acid component and contains 70% by mole of a component derived from ethylene glycol, 10% by mole of a component derived from diethylene glycol and 20% by mole of a component derived from 1,4-cyclohexanedimethanol as a diol component, was used.

As a resin composing an intermediate layer, a compounded resin A (styrene: 84.5% by weight, isoprene: 1.5% by weight, butadiene: 14% by weight, Vicat softening point: 70° C., MFR: 9.0 g/10 minutes) prepared by compounding a styrene-isoprene-butadiene copolymer with a styrene-butadiene copolymer was used.

As a resin composing an adhesive layer, a modified polyester type elastomer, which was prepared by reacting a mixture of 80 parts by weight of a polyester elastomer containing 65 parts by weight of poly(tetramethylene ether) glycol having a number average molecular weight of 2000 and 20 parts by weight of a hydrogenated styrene-butadiene-styrene block copolymer (produced by Clayton Polymer Japan Co., Ltd., G-1641H) with 0.5 part by weight of maleic anhydride and 0.15 part by weight of NYPER BMT-K40 (produced by NOF Corp.) as a radical generator at 230° C., was used.

A heat-shrinkable multilayer film having a five-layer structure of an outer surface layer (4 μm)/an adhesive layer (1 μm)/an intermediate layer (35 μm)/an adhesive layer (1 μm)/an outer surface layer (4 μm) was prepared in a similar manner to Example 5 using these resins.

Example 10

A tubiform heat-shrinkable label was prepared in a similar manner to Example 6 except that the heat-shrinkable multilayer film obtained in Example 9 was used.

Comparative Example 10

A heat-shrinkable multilayer film was prepared in a similar manner to Example 5 except that polybutylene terephthalate (produced by WinTec Polymer Ltd., DURANEX 500FP) was used as a resin composing an adhesive layer.

Comparative Example 11

A heat-shrinkable film having a thickness of 45 μm was prepared in a similar manner to Example 5 except that a monolayer heat-shrinkable film was obtained using a polyester type resin which uses terephthalic acid as a dicarboxylic acid component and contains 67% by mole of a component derived from ethylene glycol and 33% by mole of a component derived from 1,4-cyclohexanedimethanol as a diol component.

Comparative Example 12

A heat-shrinkable film having a thickness of 45 μm was prepared in a similar manner to Example 5 except that a monolayer heat-shrinkable film was obtained using a styrene-butadiene copolymer (styrene: 78% by weight, butadiene: 22% by weight, Vicat softening point: 72° C., MFR: 5.6 g/10 minutes)

Comparative Example 13

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.
As a resin composing an intermediate layer, a styrene-butadiene copolymer (styrene: 78% by weight, butadiene: 22% by weight, Vicat softening point: 72° C., MFR: 5.6 g/10 minutes) was used.
As a resin composing an adhesive layer, maleic anhydride modified linear low density polyethylene (LLDPE) was used.
A heat-shrinkable multilayer film having a five-layer structure of an outer surface layer (6 μm)/an adhesive layer (1 μm)/an intermediate layer (31 μm)/an adhesive layer (1 μm)/an outer surface layer (6 μm) was prepared in a similar manner to Example 5 using these resins.

Comparative Example 14

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.
As a resin composing an intermediate layer, a styrene-butadiene copolymer (styrene: 78% by weight, butadiene: 22% by weight, Vicat softening point: 72° C., MFR: 5.6 g/10 minutes) was used.
A heat-shrinkable multilayer film having a three-layer structure of an outer surface layer (6 μm)/an intermediate layer (33 μm)/an outer surface layer (6 μm) was prepared in a similar manner to Example 5 using these resins.

Comparative Example 15

A heat-shrinkable multilayer film having a thickness of 45 μm was prepared in a similar manner to Example 5 except that as a resin composing an adhesive layer, a mixed resin of 50% by weight of a styrene-butadiene copolymer (styrene: 78% by weight, butadiene: 22% by weight, Vicat softening point: 72° C., MFR: 5.6 g/10 minutes) and 50% by weight of a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

Experiment Example 3

A heat-shrinkable multilayer film was prepared in a similar manner to Example 5 except that a hydrogen addition product of a maleic anhydride modified styrene-butadiene block copolymer (styrene content: 30% by weight, maleic anhydride addition rate: 0.5% by weight, MFR: 4.0 g/10 minutes, specific gravity: 0.91) was used as a resin composing an adhesive layer.

(Evaluation)

The heat-shrinkable labels obtained in Examples 6, 8 and 10 and the heat-shrinkable labels obtained by the same method as in Example 6 using the heat-shrinkable films obtained in Comparative Examples and Experiment Example, were evaluated for similar evaluations to those in the paragraphs of (1) Covering property and appearance, (2) Heat resistance, (3) Tearing property along perforation and (4) Oil resistance, described above. Further, the heat-shrinkable films obtained in Examples 5, 7 and 9, Comparative Examples 10 and 13 to 15 and Experiment Example 3 were evaluated for similar evaluation to that in (5) Strength between layers before and after printing processing described above.

The results of the evaluation are shown in Table 3.

TABLE 3

| | Covering property and appearance | Heat resistance | Tearing property | Oil resistance | Strength between layers (N/10 mm) | |
| --- | --- | --- | --- | --- | --- | --- |
| | | | | | Before printing | After printing |
| Example 5 | — | — | — | — | 1.3 | 1.5 |
| Example 6 | ○ | ○ | ○ | ○ | — | — |
| Example 7 | — | — | — | — | 1.2 | 1.4 |

TABLE 3-continued

| | Covering property and appearance | Heat resistance | Tearing property | Oil resistance | Strength between layers (N/10 mm) Before printing | After printing |
|---|---|---|---|---|---|---|
| Example 8 | ○ | ○ | ○ | ○ | — | — |
| Example 9 | — | — | — | — | 1.2 | 1.3 |
| Example 10 | ○ | ○ | ○ | ○ | — | — |
| Comparative Example 10 | x | ○ | ○ | ○ | 0.4 | 0.3 |
| Comparative Example 11 | x | ○ | x | ○ | — | — |
| Comparative Example 12 | ○ | x | ○ | x | — | — |
| Comparative Example 13 | x | ○ | ○ | ○ | 0.7 | 0.5 |
| Comparative Example 14 | x | ○ | ○ | ○ | 0.2 | 0.2 |
| Comparative Example 15 | x | ○ | ○ | ○ | 0.3 | 0.3 |
| Experiment Example 3 | ○ | ○ | ○ | ○ | 1.2 | 0.8 |

Example 11

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As a resin composing an intermediate layer, a mixture prepared by adding 2.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

As a resin composing an adhesive layer, a modified polyester type elastomer, which was prepared by reacting a mixture of 80 parts by weight of a polyester elastomer containing 65 parts by weight of poly(tetramethylene ether) glycol having a number average molecular weight of 2000 and 20 parts by weight of a hydrogenated styrene-butadiene-styrene block copolymer (produced by Clayton Polymer Japan Co., Ltd., G-1641H) with 0.5 part by weight of maleic anhydride and 0.15 part by weight of NYPER BMT-K (produced by NOF Corp.) as a radical generator at 230° C., was used.

These resins were charged into an extruder whose barrel temperature was 160 to 250° C., extruded from a multilayer die of 250° C. in the form of sheet having a five-layer structure, and quenched/solidified with a take-off roll of 30° C. Then, the extruded resin sheet was stretched by 6 times in a tenter stretching machine in which temperatures of a preheating zone, a stretching zone and a thermally fixing zone were 110° C., 90° C. and 80° C., respectively, and then the stretched resin was wound up with a winder, and thereby a heat-shrinkable multilayer film was obtained. The resulting heat-shrinkable multilayer film had an overall thickness of 45 μm and had a five-layer structure an outer surface layer (6 μm)/an adhesive layer (1 μm)/an intermediate layer (31 μm)/an adhesive layer (1 μm)/an outer surface layer (6 μm).

Example 12

As a resin composing an outer surface layer, a polyester type resin, which uses terephthalic acid as a dicarboxylic acid component and contains 70% by mole of a component derived from ethylene glycol, 10% by mole of a component derived from diethylene glycol and 20% by mole of a component derived from 1,4-cyclohexanedimethanol as a diol component, was used.

As a resin composing an intermediate layer, a mixture prepared by adding 2.0 parts by weight of 2-(2'-hydroxy-3'-t-butyl-5'-methylphenyl)-5-chlorobenzotriazole as an ultraviolet absorber to 100 parts by weight of a compounded resin A (styrene: 84.5% by weight, isoprene: 1.5% by weight, butadiene: 14% by weight, Vicat softening point: 70° C., MFR: 9.0 g/10 minutes) prepared by compounding a styrene-isoprene-butadiene copolymer with a styrene-butadiene copolymer was used.

As a resin composing an adhesive layer, a modified polyester type elastomer, which was prepared by reacting a mixture of 80 parts by weight of a polyester elastomer containing 65 parts by weight of poly(tetramethylene ether) glycol having a number average molecular weight of 2000 and 20 parts by weight of a hydrogenated styrene-butadiene-styrene block copolymer (produced by Clayton Polymer Japan Co., Ltd., G-1641H) with 0.5 part by weight of maleic anhydride and 0.15 part by weight of NYPER BMT-K (produced by NOF Corp.) as a radical generator at 230° C., was used.

A heat-shrinkable multilayer film having a five-layer structure of an outer surface layer (4 μm)/an adhesive layer (1 μm)/an intermediate layer (35 μm)/an adhesive layer (1 μm)/an outer surface layer (4 μm) was prepared in a similar manner to Example 11 using these resins.

Example 13

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As a resin composing an intermediate layer, a mixture prepared by adding 7.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

As a resin composing an adhesive layer, a modified polyester type elastomer, which was prepared by reacting a mixture of 80 parts by weight of a polyester elastomer containing 65 parts by weight of poly(tetramethylene ether) glycol having a number average molecular weight of 2000 and 20 parts by weight of a hydrogenated styrene-butadiene-styrene block copolymer (produced by Clayton Polymer Japan Co., Ltd., G-1641H) with 0.5 part by weight of maleic anhydride and 0.15 part by weight of NYPER BMT-K (produced by NOF Corp.) as a radical generator at 230° C., was used.

A heat-shrinkable multilayer film having a five-layer structure of an outer surface layer (6 µm)/an adhesive layer (1 µm)/an intermediate layer (31 µm)/an adhesive layer (1 µm)/an outer surface layer (6 µm) was prepared in a similar manner to Example 11 using these resins.

Comparative Example 16

As a resin composing an outer surface layer, a polystyrene type resin comprising a styrene-butadiene copolymer (styrene: 78% by weight, butadiene: 22% by weight, Vicat softening point: 72° C., MFR: 5.6 g/10 minutes) was used.

As a resin composing an intermediate layer, a mixture prepared by adding 2.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

A heat-shrinkable multilayer film having a three-layer structure of an outer surface layer (7 µm)/an intermediate layer (31 µm)/an outer surface layer (7 µm) was prepared in a similar manner to Example 11 using these resins.

Comparative Example 17

As a resin composing an outer surface layer, a polystyrene type resin comprising a styrene-butadiene copolymer (styrene: 78% by weight, butadiene: 22% by weight, Vicat softening point: 72° C., MFR: 5.6 g/10 minutes) was used.

As a resin composing an intermediate layer, a mixture prepared by adding 7.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

A heat-shrinkable multilayer film having a three-layer structure of an outer surface layer (7 µm)/an intermediate layer (31 µm)/an outer surface layer (7 µm) was prepared in a similar manner to Example 11 using these resins.

Comparative Example 18

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As a resin composing an intermediate layer, a mixture prepared by adding 2.5 parts by weight of 2-(2'-hydroxy-3'-t-butyl-5'-methylphenyl)-5-chlorobenzotriazole as an ultraviolet absorber to 100 parts by weight of a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

A heat-shrinkable multilayer film having a three-layer structure of an outer surface layer (7 µm)/an intermediate layer (31 µm)/an outer surface layer (7 µm) was prepared in a similar manner to Example 11 using these resins.

Experiment Example 4

As a resin composing an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As a resin composing an intermediate layer, a mixture prepared by adding 2.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

A heat-shrinkable multilayer film having a three-layer structure of an outer surface layer (7 µm)/an intermediate layer (31 µm)/an outer surface layer (7 µm) was prepared in a similar manner to Example 11 using these resins.

(Evaluation)

The heat-shrinkable multilayer films produced in Examples 11 to 13, Comparative Examples 16 to 18 and Experiment Example 4 were evaluated for similar evaluations to those in the paragraphs of (6) Ultraviolet light transmittance, (7)

Presence or absence of bleed out, (9) Tearing property along perforation, (10) Oil resistance and (11) Strength between layers (adhesion), described above. The results of the evaluation are shown in Table 4.

TABLE 4

|  | Ultraviolet light transmittance (%) (wavelength in 200 to 380 nm at which transmittance is maximum) | Presence or absence of bleed out | Contamination of roll | Tearing property along perforation | Oil resistance | Adhesion |
|---|---|---|---|---|---|---|
| Example 11 | 0.3 (380 nm) | ○ | ○ | ○ | ○ | ○ |
| Example 12 | 0.6 (380 nm) | ○ | ○ | ○ | ○ | ○ |
| Example 13 | 0 | ○ | ○ | ○ | ○ | ○ |
| Comparative Example 16 | 2.3 (280 nm) | ○ | ○ | ○ | x | — |
| Comparative Example 17 | 0 | x | ○ | ○ | x | — |
| Comparative Example 18 | 1.3 (380 nm) | ○ | x | x | ○ | — |
| Experiment Example 4 | 0.2 (380 nm) | ○ | ○ | ○ | ○ | x |

—: unmeasurable

INDUSTRIAL APPLICABILITY

In accordance with the present invention, it is possible to provide a heat-shrinkable multilayer film which, in the case of using the heat-shrinkable multilayer film as a heat-shrinkable label for a container, does not produce delamination in covering a container, is superior in heat resistance, oil resistance, tearing properties along the perforation and appearance and can prevent the reduction in strength between the layers after a printing step, and a heat-shrinkable label comprising the heat-shrinkable multilayer film as a base film.

EXPLANATION OF SYMBOLS

1 intermediate layer
2 outer surface layer
3, 3' adhesive layer

The invention claimed is:

1. A heat-shrinkable multilayer film, comprising:
   an outer surface layer comprising a polyester type resin; and
   an intermediate layer comprising a polystyrene type resin,
   said outer surface layer and said intermediate layer being laminated by interposing an adhesive layer consisting essentially of a polyester type elastomer,
   wherein the polyester type elastomer composing the adhesive layer is a block copolymer comprising a polyester and polyalkylene ether glycol, and
   wherein the polyester type resin composing the outer surface layer contains a component derived from terephthalic acid as a dicarboxylic acid component, and contains a component derived from ethylene glycol and a component derived from 1,4-cyclohexanedimethanol as a diol component.

2. The heat-shrinkable multilayer film according to claim 1,
   wherein the polystyrene type resin composing the intermediate layer is an aromatic vinyl hydrocarbon-conjugated diene copolymer.

3. The heat-shrinkable multilayer film according to claim 2,
   wherein the aromatic vinyl hydrocarbon-conjugated diene copolymer is a styrene-butadiene-styrene copolymer and/or a styrene-isoprene-butadiene-styrene copolymer.

4. The heat-shrinkable multilayer film according to claim 1,
   wherein the polystyrene type resin composing the intermediate layer is a mixed resin of an aromatic vinyl hydrocarbon-conjugated diene copolymer and an aromatic vinyl hydrocarbon-aliphatic unsaturated carboxylic acid ester copolymer.

5. A heat-shrinkable label,
   which is obtainable by using the heat-shrinkable multilayer film according to claim 1.

* * * * *